No. 875,848. PATENTED JAN. 7, 1908.
C. W. PLEUKHARP.
DEVICE FOR TAPPING BEER KEGS.
APPLICATION FILED AUG. 16, 1906.
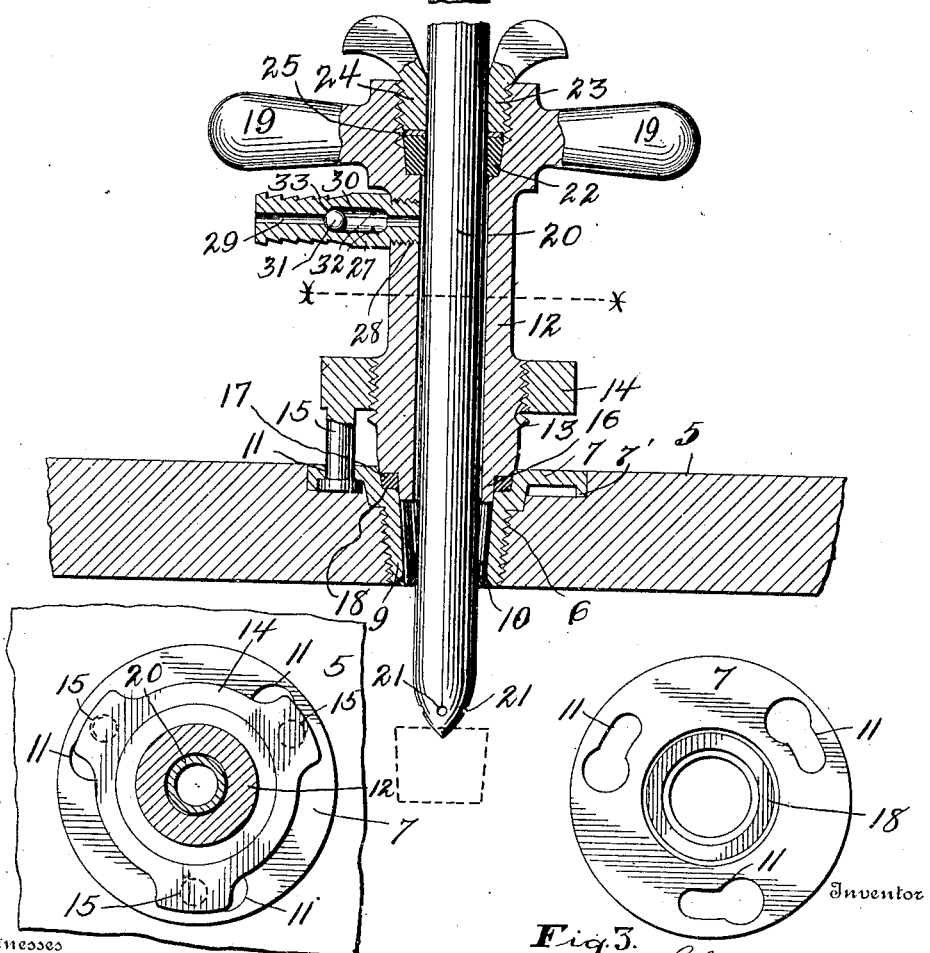
Witnesses
Carl Stoughton
F. G. Campbell
Inventor
Claude W. Pleukharp
By Shepherd & Parker
Attorneys

UNITED STATES PATENT OFFICE.

CLAUDE W. PLEUKHARP, OF COLUMBUS, OHIO, ASSIGNOR OF ONE-THIRD TO COLUMBUS D. SAVIERS AND ONE-THIRD TO CHARLES STAIGER, OF COLUMBUS, OHIO.

DEVICE FOR TAPPING BEER-KEGS.

No. 875,848.

Specification of Letters Patent.

Patented Jan. 7, 1908.

Application filed August 16, 1906. Serial No. 330,777.

*To all whom it may concern:*

Be it known that I, CLAUDE W. PLEUK-HARP, a citizen of the United States, residing at Columbus, in the county of Franklin and State of Ohio, have invented certain new and useful Improvements in Devices for Tapping Beer-Kegs, of which the following is a specification.

My invention relates to a device for tapping beer kegs, and has for its object the provision of a device of this character constructed in such manner that an air and fluid tight joint may be readily and quickly formed between the keg and the fluid discharge pipe.

Further objects and advantages of the invention will be set forth in the detailed description which now follows:

In the accompanying drawings: Figure 1 is a vertical section of a barrel tapping device constructed in accordance with the invention. Fig. 2 is a horizontal section upon line X—X of Fig. 1. Fig. 3 is a detailed view of a locking plate which is adapted to be secured in the head of the keg.

Like numerals designate corresponding parts in all of the figures of the drawings.

Referring to the drawing, the numeral 5 designates the head of the beer keg. Screwed into a tapering opening 6 is a tapering threaded bushing 9. This bushing is provided with an outstanding flange 7, said flange having formed therein key hole slots 11. This flange constitutes a locking plate and has a flange 7' depending from its periphery, said depending flange serving to space the locking plate from the head of the keg. The bushing 9 has a bore 10 formed therethrough, said bore forming the bung hole of the keg. A barrel 12 is threaded as at 13 for the reception of the nut 14. This nut has a plurality of headed studs 15 depending from its underside, said studs being equal in number to the key hole slots 11. The barrel 12 has a reduced portion 16 formed at its lower end, said reduced portion being encircled by a rubber gasket 17 which engages a shoulder 18 of the locking member. Handles 19 are formed upon the upper end of the barrel 12 and provide means for turning said barrel. A discharge pipe 20 extends through the barrel 12 and is provided with a pointed lower end. Openings 21 formed in the pipe adjacent said pointed lower end admit the beer to said discharge pipe. A gasket 22 which encircles the discharge pipe 20 is adapted to be expanded by a thumb nut 23 said thumb nut being threaded into the upper end of the barrel as at 24, and bearing against a metallic washer 25, said washer in turn bearing upon the gasket 22. A valve 26 which may be of any desired construction controls the flow of fluid through the discharge pipe 20. An air inlet pipe 27 is threaded into the barrel 12 as at 28. This air inlet pipe has a bore 29 formed therethrough. This bore is enlarged as at 30 for the reception of a rubber ball 31 said rubber ball forming a check valve. Lugs 32 limit the movement of the ball toward the right, the air passing around said ball and through the spaces between said lugs when it is desired to force air into the keg. When the ball moves to the left under the influence of the pressure from the keg it abuts against the seat 33 and closes the bore of the pipe 27. By forming this ball of rubber the pressure acts to expand said ball to a certain extent thereby affording a closer fit to the seat than would be the case if a metallic ball were used.

The operation of the device is as follows: It will be understood that the tapered threaded bushing 9 is carried by and forms a part of the keg. When the keg leaves the brewery a bung indicated in dotted lines at 35 closes the bore 10 or the bung hole of the barrel. When it is desired to tap the keg of beer the heads of the studs 15 are inserted in the enlarged portions of the key hole slots 11. The nut 14 is then given a slight turn to bring the heads of these studs beneath the walls of the reduced portion of the said key hole slots. The barrel 12 is then turned bodily to force the rubber gasket 17 firmly upon the seat formed by the shoulder 18, it being understood that said barrel will be screwed through the nut 14 at this time, said nut providing a fixed member against which the threads of the barrel work in order that said barrel may be thus forced downward. The thumb nut 23 is then screwed down sufficiently to prevent the egress of beer past the gasket 22. The discharge pipe is then forced down bodily said discharge pipe in turn forcing the bung 35 from the bung hole. After the discharge pipe 20 has been forced down to the desired extent, the thumb nut 23 is still further tightened about said discharge pipe. It will be seen that the structure forms a simple and efficient means for readily forming an air and fluid tight connection between the barrel 12 and the keg 5.

While the elements shown and described are well adapted to serve the purposes for which they are intended, it is to be understood that the invention is not limited to the precise construction set forth but includes within its purview such changes as may be made within the scope of the appended claims.

Having described my invention, what I claim is—

1. In a device of the character described, the combination with a tapered threaded bushing adapted to be screwed into the head of a keg and which has an outstanding flange formed upon the upper part thereof, said outstanding flange having key hole slots formed therein and terminating in an annular down-turned flange which extends entirely around the bushing and which serves to space the outstanding flange from the head of a keg to thereby leave an open space beneath said outstanding flange, of a nut, a plurality of studs depending from the under-side of the nut and having heads formed thereon which are adapted to engage in the key-hole slots formed in the outstanding flange of the bushing, a barrel threaded into said nut, and a gasket located between said barrel and said bushing.

2. In a device of the character described, the combination with a tapered threaded bushing adapted to be screwed into the head of a keg, said bushing having an outstanding flange formed upon the upper part thereof, said outstanding flange having key-hole slots formed therein and terminating in an annular downturned flange which extends entirely around the bushing and which serves to space the outstanding flange from the head of the keg to thereby leave an open space beneath said outstanding flange, of a nut, a plurality of studs depending from the underside of said nut and having heads formed thereon which are adapted to engage in the key-hole slots formed in the outstanding flange of the bushing, a barrel threaded into said nut, and a gasket located between said barrel and said bushing, said bushing having an annular seat formed in the upper face thereof for the reception of the gasket.

In testimony whereof I affix my signature in presence of two witnesses.

CLAUDE W. PLEUKHARP.

Witnesses:
 FRANK G. CAMPBELL,
 C. D. SAVIERS.